No. 771,862. PATENTED OCT. 11, 1904.
S. S. DEEMER.
RAILWAY TIE.
APPLICATION FILED FEB. 9, 1904.
NO MODEL.
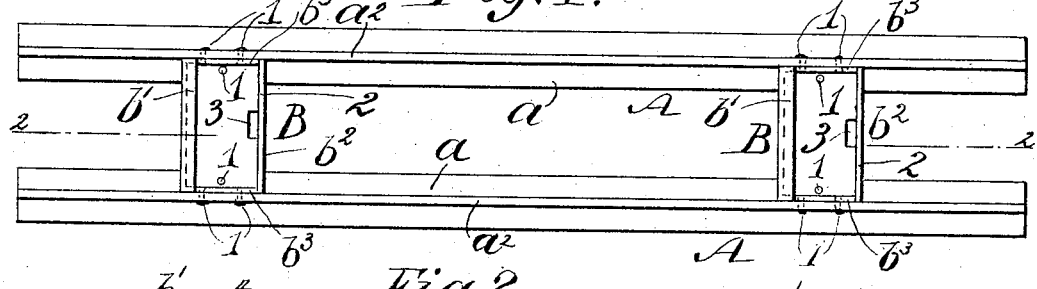
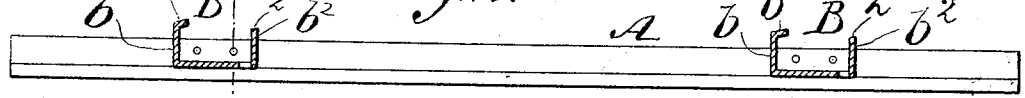
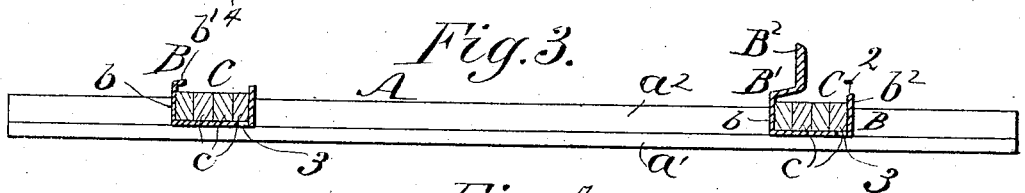
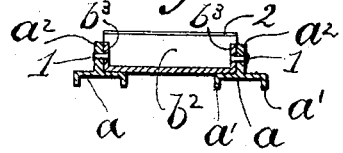
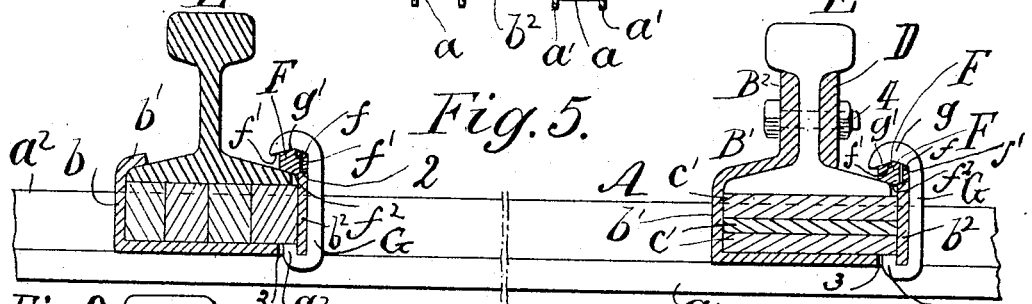
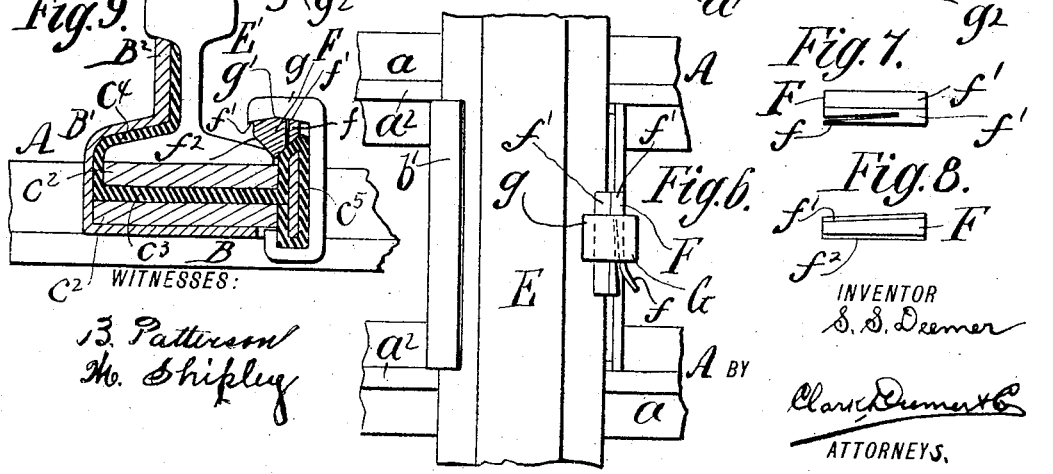
WITNESSES:
B. Patterson
M. Shipley
INVENTOR
S. S. Deemer
BY
Clark Deemer &
ATTORNEYS.

No. 771,862.

Patented October 11, 1904.

UNITED STATES PATENT OFFICE.

SELDEN SCRANTON DEEMER, OF READING, PENNSYLVANIA.

RAILWAY-TIE.

SPECIFICATION forming part of Letters Patent No. 771,862, dated October 11, 1904.

Application filed February 9, 1904. Serial No. 192,809. (No model.)

*To all whom it may concern:*

Be it known that I, SELDEN SCRANTON DEEMER, a citizen of the United States, and a resident of Reading, county of Berks, and State of Pennsylvania, have invented certain new and useful Improvements in Railway-Ties, of which the following is a specification, reference being had to the accompanying drawings, forming a part thereof, in which similar characters of reference indicate corresponding parts.

This invention relates to railway-ties, and has for its object the production of a device of this character which embodies novel features of elasticity, durability, simplicity, and general effectiveness in operation. These and other objects are attained by employing the structure hereinafter fully described, and specifically set forth in the annexed claims, and which embodies principally a base comprising two parallel metallic beams having each a vertical and upwardly-extended flange, two metallic boxes connecting said plates and each having a flange for engagement over the rail-flange, each box having a filling of elastic material for direct contact with the base of the rail-flange, and clamping means.

In the accompanying drawings, forming a part of this specification, Figure 1 is a plan view of my improved tie having the elastic fillings of the boxes removed. Fig. 2 is a sectional elevation taken on the line 2 2 of Fig. 1. Fig. 3 is a similar view showing the elastic fillings in place in the boxes and illustrating an extension of the fastening-flange of one of the boxes embodying a fish-plate structure forming part of a rail-joint; Fig. 4, a vertical sectional elevation taken on the line 4 4 of Fig. 2; Fig. 5, a transverse sectional elevation, on an enlarged scale, of a part of railway in engagement with my improved tie, the section being taken through a joint of one of the rails; Fig. 6, a plan view of part of the tie and one rail; Fig. 7, a plan view of a key employed to fasten the rail. Fig. 8 is a side elevation of said key, and Fig. 9 is a sectional elevation showing a modification.

In the practice of my invention I employ, primarily, two metallic beams A, which are respectively of inverted-T-shaped contour in cross-section, the horizontal base part $a$ of each beam having parallel downwardly-extended edge flanges or ribs $a'$ for engagement with the road-bed, the vertical flanges $a^2$ of each beam being thicker than the base thereof to provide a strong structure not liable to bend or warp.

Connected between the beams A by means of the rivets 1 and located equidistant from the center of the tie are metallic boxes B, which each have an angularly-extended preferably integrally formed flange $b'$ on one wall $b$ thereof for engagement over the rail-flange. The opposite wall $b^2$ of each box has a beveled edge 2 for engagement with a key, as will be hereinafter described, and the bottom of each box at a central point contiguous to the wall $b^2$ is provided with a slot 3 for engaging a clamping device.

It will be noted that the end walls $b^3$ of the boxes B register with the upper edge surfaces of the flanges $a^2$ of the beams A, while the horizontal walls each extend upwardly for some distance. Thus when the elastic filling C is placed within the box the upper surface thereof for contact with the rail-base is located above the top of the flange $a^2$, so that the base of the rail does not contact directly with said flanges $a^2$, whereby an elastic support is provided for the rails, which is a desirable physical condition in the construction of railways. The fillings C are preferably composed of a plurality of closely-jointed blocks or strips of wood, as $c\ c'$, whereby a practically solid bed-block is provided for directly supporting the rails; but I do not confine myself to the use of any specific material, as said fillings may be composed of any suitable elastic substance—for instance, compressed fiber, leather, &c.

The parallel rail-retaining flanges $b'$ of the tie, it will be noted by reference to the drawings, are located at the left-hand side of their respective boxes B, whereby the rail-sections can be readily slipped into place from the right side; but it is obvious that the positions can be reversed by turning the tie, and in building a railway the ties are placed with said flanges relatively staggered—that is, the ties are alternately turned, so that the retaining-flanges of a pair of ties are located opposite each other to maintain a strong general structure. Where two contiguous ends of a rail-section are to be joined, the retaining-flange of one of the boxes, as B', Figs. 3 and 5 of the drawings, is extended toward the stem of the rail and terminates in a vertical plate B², which is pierced to receive bolts, as 4, Fig. 5 of the drawings, and acts, in conjunction with an ordinary fish-plate D, to form a coupling or rail-joint. As a means for fastening the rails to the tie in conjunction with the flanges $b'$ I employ a key F and clamp G, embodying the overhanging part $g$, having the angular groove $g'$ on its under side, and the laterally and upwardly extended tongue $g^2$, which engages the opening 3 of the box B, the key being split, so that its branch $f$ may be bent to keep it in place.

In the operation and use of the device the rail-sections, as E E', are placed between the longitudinal walls of the boxes B, with the flanges $b'$ resting over one edge of the rail-flange. A clamp G is then placed in position, and a key F is wedged into place and its arm $f$ bent outwardly to secure it, as shown by Fig. 6 of the drawings. It will be noted that each key F is wedge-shaped longitudinally and in cross-sectional elevation has top surfaces which upwardly and centrally converge by angles $f'$ and register with the angular groove in the overhanging member of the clamp G, and the bottom of the key is similarly formed with surfaces which downwardly and centrally converge by angles $f^2$, thus forming an auxiliary wedge which engages between the rail-flange and beveled edge 2 of the side wall $b^2$ of the box, so that the act of driving the key not only tightens the clamp, but also forces the rail toward its retaining-flange and keeps it securely held in position. When the key becomes loosened by any cause, it is simply necessary to further drive it in place and again bend its arm $f$, the key being composed of malleable metal to make it effective for continuous use and the clamp being securely held in place because of the engagement of its tongue $g^2$ within the slot 3 of the box B.

When it is desirable to insulate the rail, the flexible fillings for the boxes embody wooden blocks $c^2$ and a centrally-located strip $c^3$, of insulating material, which is held in place between said blocks and has integral lateral extensions $c^4$ and $c^5$ for respectively covering that part of the retaining-flange contiguous to the rail and the parts of the box where the clamp engages, thus providing complete insulation. The said strip of insulating material may be leather highly compressed or any other suitable substance.

I do not confine myself to the specific details nor contour of the parts hereinbefore described, as it is obvious that under the scope of my invention I am entitled to structural variations.

Having now described my invention, what I claim as new, and desire to secure by Letters Patent, is—

1. A railway-tie comprising two parallel metallic beams and two metallic boxes connecting said beams, each box having a flange at one upper side edge and an upwardly-extended part at the opposite side edge, the boxes adapted to contain elastic fillings, substantially as shown and described.

2. A metal railway-tie comprising two parallel beams and two boxes connecting said beams, each box having at one side an overhanging flange and at the opposite side an upwardly-extended part having a beveled edge and a bottom opening contiguous to the wall of the box having the upper beveled edge, the boxes adapted for containing a filling of elastic material, substantially as shown and described.

3. A railway-tie comprising two parallel metal beams, each comprising a horizontal base part and a vertical flange, and two metal boxes having end walls which register with the upper surface of the said flanges of the beams and side walls extended above said edges, one side wall of each box having an overhanging flange and the opposite wall having its upper edge beveled, each box having an opening in its bottom contiguous to the wall containing the beveled edge, for engaging a clamp, and each box containing a filling of elastic material having its upper surface above the upper edges of the end walls of the box, whereby a rail-base will rest directly on the elastic fillings, substantially as shown and described.

4. As a railway-tie, the combination with the parallel beams and boxes connecting them, of the elastic fillings in said boxes, each box having an overhanging flange for engaging a rail-base, substantially as shown and described.

5. As a railway-tie, the combination with the parallel metal beams having each the vertical flange and horizontal base having downwardly-extended side-edge ribs, and the metal boxes having each an upwardly-extended overhanging side flange and an oppositely-located upwardly-extended beveled-edge part, and a bottom opening contiguous to the wall having said beveled-edge part, and an elastic filling in each box and having its upper surface above the upper surface of the vertical flanges of the side beams, of a clamp and key, substantially as shown and described.

6. As a railway-tie, the combination with the parallel beams and boxes connecting them, each box having a bottom opening, a filling of elastic material, one side wall having an overhanging flange and one side wall having an upwardly-extended beveled-edge part, of the clamps having the bottom tongues engaging the openings of the bottom of the boxes and the overhanging part having the angular groove, and the wedge-shaped split keys having the angular bottom and top surfaces, substantially as shown and described.

7. As a combined railway-tie, and rail-joint, the combination with the parallel beams and boxes connecting them and flexible fillings in said boxes, one box having an overhanging flange on one side and an upwardly-extended beveled-edge part at the opposite side, the other box having an overhanging flanged part extended at one side which has a vertical extension forming a fish-plate, and an upwardly-extended beveled-edge part at the opposite side, and each box having an opening in its bottom, of the clamps and keys, substantially as shown and described.

8. A railway-tie comprising a metal base embodying transverse parallel beams and parallel horizontally-extended boxes secured to said beams and elastic blocks within said boxes, each box having on one horizontal wall an upwardly and inwardly extended flange for engaging over the rail-base and an upwardly-extended bevel-edged part on the opposite horizontal wall, substantially as shown and described.

9. A railway-tie comprising a metal base embodying transversely-extended beams and two metal boxes extended between and secured to said beams, each box having on one side wall an upwardly-extended overhanging part to engage the rail-base and an upwardly-extended bevel-edged part on the opposite side wall, and blocks of elastic material within the said boxes, the upper surfaces of said blocks being above the upper surfaces of the end walls of the boxes and each box having a slot in its bottom for engaging a clamp, substantially as shown and described.

10. As a railway-tie, the combination with the parallel beams and boxes connecting them, each box having a bottom opening and a filling of elastic material, one side wall having an overhanging flange which is lined with insulating material, and one side wall having an upwardly-extended beveled-edge part and a covering of insulating material; of the clamps having the bottom tongues engaging the openings of the bottom of the boxes and the overhanging part having the angular groove, and the wedge-shaped split keys having the angular bottom and top surfaces, substantially as shown and described.

11. As a combined railway-tie and rail-joint, the combination with the parallel beams and boxes connecting them, and flexible fillings in said boxes, said fillings embodying insulators, one box having an overhanging flange on one side which is lined with insulating material, and an upwardly-extended beveled-edge part at the opposite side, and insulating material covering said side, the other box having an overhanging flanged part extended at one side which has a vertical extension forming a fish-plate, and an upwardly-extended beveled-edge part at the opposite side, and each box having an opening in its bottom, of the clamps and keys, substantially as shown and described.

In testimony that I claim the foregoing as my invention I have signed my name, in presence of two witnesses, this 4th day of February, 1904.

SELDEN SCRANTON DEEMER.

Witnesses:
J. FRED. HARTGEN,
S. LEO DONOVAN.